United States Patent
Kottari et al.

(10) Patent No.: US 11,478,782 B2
(45) Date of Patent: Oct. 25, 2022

(54) CATALYST FOR HEAVY OIL UPGRADATION

(71) Applicant: HINDUSTAN PETROLEUM CORPORATION LIMITED, Mumbai (IN)

(72) Inventors: Naresh Kottari, Bangalore (IN); Kanuparthy Naga Raja, Bangalore (IN); Siva Kesava Raju Chintalapati, Bangalore (IN); Satyanarayana Murty Pudi, Bangalore (IN); Bhavesh Sharma, Bangalore (IN); Ramkumar Mangala, Bangalore (IN); Peddy Venkat Chalapathi Rao, Bangalore (IN); Nettem Venkateswarlu Choudary, Bangalore (IN); Gandham Sriganesh, Bangalore (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 136 days.

(21) Appl. No.: 16/627,458

(22) PCT Filed: Jul. 27, 2018

(86) PCT No.: PCT/IN2018/050494
§ 371 (c)(1),
(2) Date: Dec. 30, 2019

(87) PCT Pub. No.: WO2019/077619
PCT Pub. Date: Apr. 25, 2019

(65) Prior Publication Data
US 2021/0146345 A1 May 20, 2021

(30) Foreign Application Priority Data
Oct. 18, 2017 (IN) .............................. 201721037100

(51) Int. Cl.
*B01J 31/04* (2006.01)
*B01J 23/755* (2006.01)
*B01J 23/883* (2006.01)
*B01J 37/00* (2006.01)
*B01J 37/04* (2006.01)
*C10G 47/02* (2006.01)

(52) U.S. Cl.
CPC ............. *B01J 31/04* (2013.01); *B01J 23/755* (2013.01); *B01J 23/883* (2013.01); *B01J 37/009* (2013.01); *B01J 37/04* (2013.01); *C10G 47/02* (2013.01); *B01J 2523/842* (2013.01); *B01J 2523/845* (2013.01); *B01J 2523/847* (2013.01); *B01J 2540/12* (2013.01); *C10G 2300/1033* (2013.01); *C10G 2300/1077* (2013.01)

(58) Field of Classification Search
CPC ........ B01J 23/755; B01J 23/883; B01J 31/04; B01J 37/009; B01J 37/04; B01J 2523/842; B01J 2523/845; B01J 2523/847; B01J 2531/842; B01J 2531/845; B01J 2531/847; B01J 2540/12; C10G 45/00; C10G 47/02; C10G 49/04; C10G 2300/1033; C10G 2300/1077
See application file for complete search history.

(56) References Cited

U.S. PATENT DOCUMENTS

| | | | |
|---|---|---|---|
| 5,578,197 A | 11/1996 | Cyr et al. | |
| 7,842,635 B2 | 11/2010 | Zhou et al. | |
| 2007/0158236 A1* | 7/2007 | Zhou | B01J 23/28 502/103 |
| 2009/0308792 A1 | 12/2009 | Wu et al. | |
| 2011/0294656 A1 | 12/2011 | Soled et al. | |

FOREIGN PATENT DOCUMENTS

| | | |
|---|---|---|
| JP | 2009522102 A | 6/2009 |
| JP | 2012525252 A | 10/2012 |
| JP | 2013528489 A | 7/2013 |

OTHER PUBLICATIONS

International Search Report, dated Jan. 2, 2019 (PCT/IN2018/050494).

* cited by examiner

*Primary Examiner* — Brian A McCaig
(74) *Attorney, Agent, or Firm* — Robert L. Stearns; Dickinson Wright, PLLC

(57) ABSTRACT

A catalyst is provided having: (a) at least one multimetallic salt; and (b) at least one organic acid, wherein the at least one multimetallic salt to the at least one organic acid weight ratio is in the range of 1:0.01-1:0.5. A process is also provided for the preparation of the catalyst and for the preparation of the multimetallic salt.

9 Claims, No Drawings

CATALYST FOR HEAVY OIL UPGRADATION

BACKGROUND

1. Technical Field

The present disclosure is in the field of petroleum refining. In particular, it pertains to heavy-oil upgrading. The present disclosure further relates to a process for preparing the oil-soluble catalyst and the multimetallic carboxylate salts.

2. Related Art

There is a huge global demand for light crude oil due to its inadequate production and supply in the international market. The light crude oil is a lower boiling, higher quality upgraded product as compared to the higher boiling, lower quality heavy oil. The method for converting heavy oil feedstock into light crude oil involves the hydrocracking process predominantly employing organometallic catalysts. Hydrocracking is a two-step process, involving the cracking of the heavy oil hydrogenating to form lighter hydrocarbons. The organometallic catalysts used in the hydrocracking process mostly comprise transition metal complexes.

U.S. Pat. No. 5,578,197 A describes the use of molybdenum salt as the catalyst for hydrocracking. However, the high cost of molybdenum-based catalyst has prompted research in the direction of exploiting multi-metallic formulations having molybdenum as one of the components. Such formulations face the challenge of retaining the efficacy achieved by molybdenum alone, while introducing cost-effectiveness to the formulation.

However, on the other hand, the synergistic effect for the bimetallic Co—Mo and Ni—Mo is well reported in U.S. Pat. No. 7,842,635 B2 to be used in solid phase catalysis. The cost of these oil soluble bimetallic catalysts is a concern and there is scope for the development of cost effective synthetic procedures employing catalysts using metals that are cheaper commercially. Even small improvements in catalyst performance can add a significant benefit to the cost of these synthetic procedures as catalysts with higher turnover numbers are needed in smaller quantity to achieve acceptable conversion.

The continuing need for processes and catalysts that increase the efficiency and economy of upgrading low value petroleum materials have raised the requirements for the catalyst formulations, yet such processes and catalyst formulations would be of great importance globally. The organometallic catalysts used in the heavy oil hydrocracking process have additionally been known to undergo rapid deactivation during the hydrogenation step. Therefore, an organometallic catalyst formulation having low priced transition metals with improved performance in upgrading heavy oil is of dire need.

SUMMARY

The instant disclosure relates to a catalyst comprising: (a) at least one multimetallic salt; and (b) at least one organic acid, wherein the at least one multimetallic salt to the at least one organic acid weight ratio is in the range of 1:0.01-1:0.5.

The instant disclosure also relates to a process for the preparation of the catalyst comprising: (a) at least one multimetallic salt; and (b) at least one organic acid, said process comprising the steps of (a) obtaining the at least one multimetallic salt; (b) contacting the at least one multimetallic salt, and the at least one organic acid with the at least one other solvent to obtain a first mixture; and (d) processing the first mixture to obtain the catalyst.

These and other features, aspects and advantages of the present subject matter will be better understood with reference to the following description and appended claims. This summary is provided to introduce a selection of concepts in a simplified form. This summary is not intended to be used to limit the scope of the claimed subject matter.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "between" should be understood as being inclusive of the limits.

The term "haloalkyl" embraces radicals wherein any one or more of the $C_{1-16}$ alkyl carbon atoms is substituted with halo as defined above.

The term "cycloalkyl" refers to non-aromatic mono or polycyclic ring system of about 3 to 12 carbon atoms, which may be optionally substituted by one or more substituents. The polycyclic ring denotes hydrocarbon systems containing two or more ring systems with one or more ring carbon atoms in common, i.e., a spiro, fused or bridged structures. Preferred cycloalkyl groups include, without limitation, cyclopropyl, cyclobutyl, cyclopentyl, cyclohexyl, cyclooctanyl, perhydronaphthyl, adamantyl, noradamantyl and norbornyl groups, bridged cyclic groups or spirobicyclic groups e.g. spiro[4.4]non-2-yl and the like.

The term "heteroaryl" refers to a heteroaromatic carbocyclic group of 1 to 20 carbon atoms having a single ring (e.g. pyridine) or multiple rings (e.g. isoquinoline), or multiple condensed (fused) rings. Preferred heteroaryls include thiophene, pyrazole, thiazole, pyridine and the like. The groups may be optionally substituted.

Furthermore, the term "heterocyclyl" refers to at least one stable 3 to 6 membered heterocyclic ring, which consists of 1-20 carbon atoms and from one to five heteroatoms selected from nitrogen, phosphorus, oxygen and sulfur. For purposes of this invention the heterocyclic ring may be monocyclic, bicyclic or tricyclic ring systems, and the nitrogen, phosphorus, carbon, oxygen or sulfur atoms in the heterocyclic ring may be optionally oxidized to various oxidation states. In addition, the nitrogen atom may be optionally quaternized; and the heterocyclic ring may be partially or fully saturated. Preferred heterocyclyl groups, without limitation, include azetidinyl, acridinyl, benzodioxolyl, benzodioxanyl, benzofuranyl, carbazolyl, cinnolinyl, dioxolanyl, indolizinyl, naphthyridinyl, perhydroazepinyl, phenazinyl, phenothiazinyl, phenoxazinyl, phthalazinyl, pyrazolyl, pyridyl, pteridinyl, purinyl, quinazolinyl, qunioxalinyl, quinolinyl, isoquinolinyl, tetrazolyl, imidazolyl, tetrahydroisoquinolinyl, piperidinyl, piperazinyl, homopiperazinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, triazolyl, indanyl, isoxazolyl, isoxazolidinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, thienyl, morpholinyl, thiomorpholinyl, thiamorpholinyl sulfoxide, furyl, tetrahydrofuryl, tetrahydropyranyl, chromanyl and isochromanyl. The groups may be optionally substituted.

The term "alkanediyl" refers to a divalent saturated aliphatic group having 1-16 carbon atoms, with one or two saturated carbon atom(s) as the point(s) of attachment. The groups —CH$_2$— (methylene), —CH$_2$CH$_2$—, —CH$_2$C(CH$_3$)$_2$CH$_2$—, —CH$_2$CH$_2$CH$_2$— are non-limiting examples of alkanediyl groups. The groups may be optionally substituted.

The term "arylene" refers to an aromatic group where two hydrogen atoms are removed allowing for a group to be substituted at the position where the two hydrogen atoms were removed, and having 5 to 22 carbon atoms. The groups may be optionally substituted.

The term "haloalkanediyl" refers to a divalent saturated aliphatic group having 1-16 carbon atoms, with one or two saturated carbon atom(s) as the point(s) of attachment, and wherein any one or more of the C$_{1-16}$ alkyl carbon atoms is substituted with 'halo' as defined above. The groups may be optionally substituted.

The term "cycloalkanediyl" refers to a diradical saturated monocyclic or polycyclic hydrocarbon group. Examples of "cycloalkanediyl" include, without limitation, 'cyclopropanediyl', and 'cyclobutanediyl'. The groups may be optionally substituted.

The term "heteroarenediyl" refers to a divalent heteroaromatic carbocyclic group of 1 to 20 carbon atoms having a single ring (e.g. pyridine) or multiple rings (e.g. isoquinoline), or multiple condensed (fused) rings. The groups may be optionally substituted.

The term "heterocyclicdiyl" refers to a divalent, stable 2 to 6 membered rings radical, which consists of 1-20 carbon atoms and from one to five heteroatoms selected from nitrogen, phosphorus, oxygen and sulfur. For purposes of this invention the heterocyclicdiyl ring radical may be monocyclic, bicyclic or tricyclic ring systems, and the nitrogen, phosphorus, carbon, oxygen or sulfur atoms in the heterocyclic ring radical may be optionally oxidized to various oxidation states. In addition, the nitrogen atom may be optionally quaternized; and the ring radical may be partially or fully saturated. The groups may be optionally substituted.

The term "catalyst" or "catalyst formulation" has been used interchangeably throughout the present disclosure in order to define the oil-soluble metal carboxylate formulations that have been employed for upgradation process described herein. The said metal carboxylate further converts to an active metal sulfide form after dissolution in the heavy oil or hydrocarbon feedstock.

The term "oil-soluble" is used to refer to the catalyst compounds that are essentially "dissolved" or completely dissociated from other catalyst compounds or molecules in a heavy oil or hydrocarbon feedstock.

The term "multimetallic carboxylates" refers to a neutral metal carboxylate salt consisting of more than one transition metal cation/s and carboxylate anions.

The metal carboxylates could be "bimetallic" or "multimetallic". The molar fractions of metals in the catalyst can be varied from 0.1 to 0.9. For example the combinations such as Fe$_{0.5}$Co$_{0.5}$A$_y$, Fe$_{0.1}$Co$_{0.9}$A$_y$, Co$_{0.1}$Ni$_{0.9}$A$_y$, Mo$_{0.9}$W$_{0.1}$A$_y$, Fe$_x$Co$_y$Al$_{0.5}$A2$_{0.5}$, Fe$_x$Co$_y$Al$_{0.2}$A2$_{0.8}$, Co$_x$Ni$_y$Al$_{0.9}$A2$_{0.1}$ are under the scope of the present invention; A1 and A2 are mono or dicarboxylic aliphatic and/or aromatic acids; x and y are the variable stoichiometry.

The metal compounds used for the preparation of hydrocarbon soluble catalyst are water soluble transition metal salts, for example, Fe, Co, Ni, Mo, W, Cu, V and Zn salts. The term "metal salts" means a compound in which metal in positive state with the negative counter ion. The preferred salts are metal halides, metal nitrates and metal sulfates.

The term "organic phase" means the hydrocarbon solvent layer consisting of, such as, hexane, toluene, xylene, diesel, kerosene, naphtha etc. The hydrocarbon layer is separated after the completion of the reaction and concentrated to afford the oil soluble multimetallic catalyst.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Molar equivalent ratios of metals and organic agents may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 50° C. to about 90° C. should be interpreted to include not only the explicitly recited limits of about 50° C. to about 90° C., but also to include sub-ranges, such as 55° C. to 65° C., 70° C. to 75° C., and so forth, as well as individual amounts, including fractional amounts, within the specified ranges, such as 52.2° C., 50.6° C., and 51.3° C., for example.

The present disclosure is not to be limited in scope by the specific embodiments described herein, which are intended for the purposes of exemplification only. Functionally equivalent products, compositions, and methods are clearly within scope of the disclosure, as described herein.

With regards to the problems accompanied with the organometallic catalysts, as discussed in the background section, the present disclosure provides various proportions of the multimetallic salt in a formulation of a catalyst. This catalyst is used for upgrading the higher boiling, low quality heavy oil feedstocks into lower boiling, high quality light crude oil. Thus, the present disclosure furnishes a catalyst comprising multimetallic carboxylate salt and an organic acid, for efficient heavy oil upgradation in a cost effective manner.

In an embodiment of the present disclosure, there is provided a catalyst comprising: (a) at least one multimetallic salt; and (b) at least one organic acid, wherein the at least one multimetallic salt to the at least one organic acid weight ratio is in the range of 1:0.01-1:0.5.

In an embodiment of the present disclosure, there is provided a catalyst as described herein, wherein the multimetallic salt is a salt of at least two transition metals, and at least one carboxylate.

In an embodiment of the present disclosure, there is provided a catalyst comprising: (a) at least one multimetallic salt having (i) at least two transition metals, and (ii) at least one carboxylate; and (b) at least one organic acid, wherein the at least one multimetallic salt to the at least one organic acid weight ratio is in the range of 1:0.01-1:0.5.

In an embodiment of the present disclosure, there is provided a catalyst as described herein, wherein the at least two transition metals selected from the group consisting of group I-B metals, II-B metals, V-B metals, VIII-B metals, and combinations thereof. In another embodiment, the at least two transition metals selected from the group consisting of group consisting of V, Mo, Fe, Co, Ni, Cu, Zn, W, and combinations thereof. In yet another embodiment, the at least two transition metals selected from the group consisting of group consisting of Fe, Ni, Co, Mo, W, and combinations thereof.

In an embodiment of the present disclosure, there is provided a catalyst as described herein, wherein the at least one carboxylate is having the Formula R(COO$^-$)$_a$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl.

In an embodiment of the present disclosure, there is provided a catalyst as described herein, wherein the at least one organic acid is selected from the group consisting of $C_{5-20}$ monocarboxylic acids, $C_{5-20}$ dicarboxylic acids, and combinations thereof.

In an embodiment of the present disclosure, there is provided a catalyst as described herein, wherein the at least one organic acid is selected from $C_{5-10}$ aryl monocarboxylic acids. In another embodiment of the present disclosure the at least one organic acid is benzoic acid.

In an embodiment of the present disclosure, there is provided a catalyst comprising: (a) at least one multimetallic salt having (i) at least two transition metals selected from the group consisting of group consisting of group I-B metals, II-B metals, V-B metals, VIII-B metals, and combinations thereof, and (ii) at least one carboxylate having the Formula R(COO$^-$)$_a$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; and (b) at least one organic acid selected from the group consisting of $C_{5-20}$ monocarboxylic acids, $C_{5-20}$ dicarboxylic acids, and combinations thereof, wherein the at least one multimetallic salt to the at least one organic acid weight ratio is in the range of 1:0.01-1:0.5.

In an embodiment of the present disclosure, there is provided a catalyst comprising: (a) at least one multimetallic salt having (i) at least two transition metals selected from the group consisting of group consisting of V, Mo, Fe, Co, Ni, Cu, Zn, W, and combinations thereof, and (ii) at least one carboxylate having the Formula R(COO$^-$)$_a$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, 12 cycloalkanediyl, $C_{1-20}$ heteroarenediyl, $C_{1-20}$ heterocyclicdiyl; and (b) at least one organic acid selected from the group consisting of $C_{5-20}$ monocarboxylic acids, $C_{5-20}$ dicarboxylic acids, and combinations thereof, wherein the at least one multimetallic salt to the at least one organic acid weight ratio is in the range of 1:0.01-1:0.5.

In an embodiment of the present disclosure, there is provided a catalyst comprising: (a) at least one multimetallic salt having (i) at least two transition metals selected from the group consisting of group consisting of Fe, Ni, Co, Mo, W, and combinations thereof, and (ii) at least one carboxylate having the Formula R (COO$^-$)$_a$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_1$-16 alkanediyl, $C_5$-22 arylene, $C_1$-16 haloalkanediyl, $C_3$-12 cycloalkanediyl, heteroarenediyl, $C_{1-20}$ heterocyclicdiyl; and (b) at least one organic acid selected from the group consisting of $C_{5-20}$ monocarboxylic acids, $C_{5-20}$ dicarboxylic acids, and combinations thereof, wherein the at least one multimetallic salt to the at least one organic acid weight ratio is in the range of 1:0.01-1:0.5.

In an embodiment of the present disclosure there is provided a process for the preparation of the catalyst as described herein, wherein said process comprising the steps of: (a) obtaining the at least one multimetallic salt; (b) contacting the at least one multimetallic salt, and the at least one organic acid with the at least one other solvent to obtain a first mixture; and (d) processing the first mixture to obtain the catalyst.

In another embodiment of present disclosure, there is provided a process for the preparation of the catalyst as described herein, wherein: (a) the at least one transition metal to the at least one carboxylate salt molar ratio in the first mixture is in the range of 1:2-1:8; (b) the at least one transition metal salt to the water moles to volume ratio in the first mixture is in the range of 1:1.5-1:2; and (c) the at least one transition metal salt to the at least one solvent moles to volume ratio in the first mixture is in the range of 1:2-1:4.

In an embodiment of the present disclosure there is provided a process for the preparation of the catalyst as described herein, wherein said process comprising the steps of: (a) obtaining the at least one multimetallic salt; (b) contacting the at least one multimetallic salt, and the at least one organic acid with the at least one other solvent to obtain a first mixture; and (d) processing the first mixture to obtain the catalyst, wherein the at least one transition metal to the at least one carboxylate salt molar ratio in the first mixture is in the range of 1:2-1:8, the at least one transition metal salt to the water moles to volume ratio in the first mixture is in the range of 1:1.5-1:2, and the at least one transition metal salt to the at least one solvent moles to volume ratio in the first mixture is in the range of 1:2-1:4.

In an embodiment of present disclosure, there is provided a process for the preparation of the catalyst as described herein, wherein (a) obtaining the at least one multimetallic salt; (b) contacting the at least one multimetallic salt, and the at least one organic acid with the at least one other solvent to obtain a first mixture is carried out at a temperature in the range of 25-35° C. for a period in the range of 10-50 min; and (d) processing the first mixture to obtain the catalyst is carried out at a temperature in the range of 25-35° C. for a period in the range of 10-50 min.

In an embodiment of present disclosure, there is provided a process for the preparation of the catalyst as described herein, wherein obtaining the at least one multimetallic salt further comprising the steps of: (a) contacting (i) at least two transition metal salts independently having the Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture; (b) processing the first mixture to obtain a multimetallic salt.

In an embodiment of present disclosure, there is provided a process for the preparation of the catalyst as described herein, wherein (a) contacting (i) at least two transition metal salts independently having Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture is carried out at a temperature in the range of 50-90° C. for a period in the range of 100-200 min; (b) processing the first mixture to obtain the multimetallic salt is carried out at a temperature in the range of 25-35° C. for a period in the range of 10-50 min.

In another embodiment of present disclosure, there is provided a process for the preparation of the catalyst as described herein, wherein: (a) contacting (i) at least two transition metal salts independently having Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture is carried out at a temperature in the range of 50-90° C. for a period in the range of 100-200 min; (b) processing the first mixture to obtain the second mixture is carried out at a temperature in the range of 25-35° C. for a period in the range of 10-50 min; (c) contacting the second mixture, and at least one organic acid with the at least one other solvent to obtain a third mixture is carried out at a temperature in the range of 25-35° C. for a period in the range of 10-50 min; (d) processing the third mixture to obtain the catalyst is carried out at a temperature in the range of 25-35° C. for a period in the range of 10-50 min.

In another embodiment of present disclosure, there is provided a process for the preparation of the catalyst as described herein, wherein: (a) contacting (i) at least two transition metal salts independently having Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture is carried out at a temperature in the range of 50-90° C. for a period in the range of 100-200 min; (b) processing the first mixture to obtain the second mixture is carried out at a temperature in the range of 25-35° C. for a period in the range of 10-50 min; (c) contacting the second mixture, and at least one organic acid with the at least one other solvent to obtain a third mixture is carried out at a temperature in the range of 25-35° C. for a period in the range of 10-50 min; (d) processing the third mixture to obtain the catalyst is carried out at a temperature in the range of 25-35° C. for a period in the range of 10-50 min, wherein the at least one transition metal to the at least one carboxylate salt molar ratio in the first mixture is in the range of 1:2-1:8, the at least one transition metal salt to the water moles to volume ratio in the first mixture is in the range of 1:1.5-1:2, and the at least one transition metal salt to the at least one solvent moles to volume ratio in the first mixture is in the range of 1:2-1:4.

In another embodiment of present disclosure, there is provided a process for the preparation of the catalyst as described herein, wherein the carboxylate salt is having the Formula $R(COO)_a X_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_5$-22 arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule.

In another embodiment of present disclosure, there is provided a process for the preparation of the catalyst as described herein, wherein the at least one solvent is selected from the group consisting of hexane, toluene, xylene, diesel, kerosene, naphtha, and combinations thereof.

In another embodiment of present disclosure, there is provided a process for the preparation of the catalyst as described herein, wherein the at least one other solvent is selected from the group consisting of toluene, xylene, diesel, kerosene, naphtha, and combinations thereof.

In an embodiment of the present disclosure there is provided a process for the preparation of the catalyst as described herein, wherein said process comprising the steps of: (a) contacting (i) at least two transition metal salts independently having the Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_a X_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture; (b) processing the first mixture to obtain a second mixture; (c) contacting the second mixture, and at least one organic acid selected from the group consisting of $C_{5-20}$ monocarboxylic acids, $C_{5-20}$ dicarboxylic acids, and combinations thereof with the at least one other solvent selected from the group consisting of toluene, xylene, diesel, kerosene, naphtha, and combinations thereof to obtain a third mixture; and (d) processing the third mixture to obtain the catalyst.

In an embodiment of the present disclosure there is provided a process for the preparation of the catalyst as described herein, wherein said process comprising the steps of: (a) contacting (i) at least two transition metal salts independently having the Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture; (b) processing the first mixture to obtain a second mixture; (c) contacting the second mixture, and at least one organic acid selected from the group consisting of $C_{5-20}$ monocarboxylic acids, $C_{5-20}$ dicarboxylic acids, and combinations thereof with the at least one other solvent selected from the group consisting of toluene, xylene, diesel, kerosene, naphtha, and combinations thereof to obtain a third mixture; and (d) processing the third mixture to obtain the catalyst, wherein the at least one transition metal to the at least one carboxylate salt molar ratio in the first mixture is in the range of 1:2-1:8, the at least one transition metal salt to the water moles to volume ratio in the first mixture is in the range of 1:1.5-1:2, and the at least one transition metal salt to the at least one solvent moles to volume ratio in the first mixture is in the range of 1:2-1:4.

In another embodiment of present disclosure, there is provided a process for the preparation of the catalyst as described herein, wherein: (a) contacting (i) at least two transition metal salts independently having Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture is carried out at a temperature in the range of 50-90° C. for a period in the range of 100 min-200 min; (b) processing the first mixture to obtain the second mixture is carried out at a temperature in the range of 25-35° C. for a period in the range of 10 min-50 min; (c) contacting the second mixture, and at least one organic acid selected from the group consisting of $C_{5-20}$ monocarboxylic acids, $C_{5-20}$ dicarboxylic acids, and combinations thereof with the at least one other solvent selected from the group consisting of toluene, xylene, diesel, kerosene, naphtha, and combinations thereof to obtain a third mixture is carried out at a temperature in the range of 25-35° C. for a period in the range of 10 min-50 min; (d) processing the third mixture to obtain the catalyst is carried out at a temperature in the range of 25-35° C. for a period in the range of 10 min-50 min.

In another embodiment of present disclosure, there is provided a process for the preparation of the catalyst as described herein, wherein: (a) contacting (i) at least two transition metal salts independently having Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-17}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture is carried out at a temperature in the range of 50-90° C. for a period in the range of 100-200 min; (b) processing the first mixture to obtain the second mixture is carried out at a temperature in the range of 25-35° C. for a period in the range of 10-50 min; (c) contacting the second mixture, and at least one organic acid selected from the group consisting of $C_{5-20}$ monocarboxylic acids, $C_{5-20}$ dicarboxylic acids, and combinations thereof with the at least one other solvent selected from the group consisting of toluene, xylene, diesel, kerosene, naphtha, and combinations thereof to obtain a third mixture is carried out at a temperature in the range of 25-35° C. for a period in the range of 10-50 min; (d) processing the third mixture to obtain the catalyst is carried out at a temperature in the range of 25-35° C. for a period in the range of 10-50 min, wherein the at least one transition metal to the at least one carboxylate salt molar ratio in the first mixture is in the range of 1:2-1:8, the at least one transition metal salt to the water moles to volume ratio in the first mixture is in the range of 1:1.5-1:2, and the at least one transition metal salt to the at least one solvent moles to volume ratio in the first mixture is in the range of 1:2-1:4.

In an embodiment of the present disclosure there is provided a process for the preparation of the multimetallic salt as described herein, wherein the multimetallic salt is having: (a) at least two transition metals, and (b) at least one carboxylate, said process comprising the steps of: (a) contacting (i) at least two transition metal salts independently having the Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture; (b) processing the first mixture to obtain a multimetallic salt.

In an embodiment of the present disclosure there is provided a process for the preparation of the multimetallic salt as described herein, wherein (a) contacting (i) at least two transition metal salts independently having Formula M-S, wherein M is at least one transition metal and S is a ligand selected from the group consisting of nitrate, halide, sulfate, sulfite, and nitrite; (ii) at least one carboxylate salt; (iii) water; and (iv) at least one solvent to obtain a first mixture is carried out at a temperature in the range of 50-90° C. for a period in the range of 100 min-200 min; (b) processing the first mixture to obtain the multimetallic salt is carried out at a temperature in the range of 25-35° C. for a period in the range of 10 min-50 min.

In an embodiment of the present disclosure there is provided a process for the preparation of the multimetallic salt as described herein, wherein the at least one transition metal is selected from the group consisting of group I-B metals, II-B metals, V-B metals, VIII-B metals, and combinations thereof.

In an embodiment of the present disclosure there is provided a process for the preparation of the multimetallic salt as described herein, wherein the at least one transition metal is selected from the group consisting of V, Mo, Fe, Co, Ni, Cu, Zn, W, and combinations thereof.

In an embodiment of the present disclosure there is provided a process for the preparation of the multimetallic salt as described herein, wherein the at least one transition metal is selected from the group consisting of Fe, Ni, Co, Mo, W, and combinations thereof.

In an embodiment of the present disclosure there is provided a process for the preparation of the multimetallic salt as described herein, wherein the carboxylate salt is having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule.

In an embodiment of the present disclosure there is provided a process for the preparation of the multimetallic salt as described herein, wherein the at least one solvent is selected from the group consisting of hexane, toluene, xylene, diesel, kerosene, naphtha, and combinations thereof.

In an embodiment of the present disclosure there is provided a process for the preparation of the multimetallic salt as described herein, wherein the multimetallic salt is having: (a) at least two transition metals, and (b) at least one carboxylate, said process comprising the steps of: (a) contacting (i) at least two transition metal salts independently having the Formula M-S, wherein M is at least one transition metal selected from the group consisting of V, Mo, Fe, Co, Ni, Cu, Zn, W, and combinations thereof and S is a ligand selected from the group consisting of nitrate, halide, sulfite, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture; (b) processing the first mixture to obtain a multimetallic salt.

In an embodiment of the present disclosure there is provided a process for the preparation of the multimetallic salt as described herein, wherein the multimetallic salt is having: (a) at least two transition metals, and (b) at least one carboxylate, said process comprising the steps of: (a) contacting (i) at least two transition metal salts independently having the Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture; (b) processing the first mixture to obtain a multimetallic salt.

In an embodiment of the present disclosure there is provided a process for the preparation of the multimetallic salt as described herein, wherein (a) contacting (i) at least two transition metal salts independently having Formula M-S, wherein M is at least one transition metal selected from the group consisting of V, Mo, Fe, Co, Ni, Cu, Zn, W, and combinations thereof and S is a ligand selected from the group consisting of nitrate, halide, sulfate, sulfite, and nitrite; (ii) at least one carboxylate salt having the Formula $R(COO)_aX_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture is carried out at a temperature in the range of 50-90° C. for a period in the range of 100-200 min; (b) processing the first mixture to obtain the multimetallic salt is carried out at a temperature in the range of 25-35° C. for a period in the range of 10-50 min.

In an embodiment of the present disclosure there is provided a process for the preparation of the multimetallic salt as described herein, wherein (a) contacting (i) at least two transition metal salts independently having Formula M-S, wherein M is at least one transition metal selected from the group consisting of Fe, Ni, Co, Mo, W, and combinations thereof and S is a ligand selected from the group consisting of nitrate, halide, sulfate, sulfite, and nitrite; (ii) at least one carboxylate salt having the Formula $R(COO)_a X_b$, wherein 'a' is in the range of 1-2; when 'a' is 1, R is selected from the group consisting of $C_{1-16}$ alkyl, $C_{5-22}$ aryl, $C_{1-16}$ haloalkyl, $C_{3-12}$ cycloalkyl, $C_{1-20}$ heteroaryl, and $C_{1-20}$ heterocyclyl; when 'a' is 2, R is selected from the group consisting of $C_{1-16}$ alkanediyl, $C_{5-22}$ arylene, $C_{1-16}$ haloalkanediyl, $C_{3-12}$ cycloalkanediyl, $C_{1-20}$ heteroarenediyl, $C_{1-20}$ heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule; (iii) water; and (iv) at least one solvent selected from the group consisting of hexane, toluene, xylene, diesel, kerosene, naphtha, and combinations thereof to obtain a first mixture is carried out at a temperature in the range of 50-90° C. for a period in the range of 100-200 min; (b) processing the first mixture to obtain the multimetallic salt is carried out at a temperature in the range of 25-35° C. for a period in the range of 10-50 min.

EXAMPLES

The following examples are given by way of illustration of the present invention and should not be construed to limit the scope of the present disclosure. It is to be understood that both the foregoing general description and the following detailed description are exemplary and explanatory only and are intended to provide further explanation of the claimed subject matter.

Example 1: Preparation of Oil Soluble Fe/Ni Based Catalyst SOSCAT-7

To a solution of Iron (III) nitrate salt (0.5 eq.) and Nickel (II) nitrate salt (0.5 eq.) in water and hexane (1:2 ratio; 5 ml per 1 mmol of Fe/Ni salt), the sodium 2-ethyl hexyl carboxylate (4 eq.) in water (solution of 1 mmol in 1 ml water) was added drop wise at 70° C. and the solution was refluxed for 3 h at 80° C. to obtain the first mixture. The resulting reaction mixture was cooled and fractionated between water/hexane layers. The organic layer was washed with water. The organic phase was dried ($NaSO_4$), concentrated in vacuum to afford the Iron-Nickel carboxylate as a gummy solid (second mixture). Yield: 85%; WD-XRF: 3.7% Fe and 3.2% Ni.

Example 2: Preparation of Oil Soluble Fe/Ni Based Catalyst SOSCAT-14

To a solution of Iron (III) nitrate salt (0.5 eq.) and Nickel (II) nitrate salt (0.5 eq.) in water and hexane (1:2 ratio; 5 ml per 1 mmol of Fe/Ni salt), the sodium 2-ethyl hexyl carboxylate (4 eq.) in water (solution of 1 mmol in 1 ml water) was added drop wise at 70° C. and the solution was refluxed for 3 h at 80° C. to obtain the first mixture. The resulting reaction mixture was cooled and fractionated between water/hexane layers. The organic layer was washed with the water. The organic phase was dried ($NaSO_4$), concentrated in vacuum to afford the Iron-Nickel carboxylate as a gummy solid (second mixture). Yield: 85%; WD-XRF: 3.7% Fe and 3.2% Ni. Subsequently with 0.97 wt % of benzoic acid is mixed with the above gummy solid in toluene (third mixture) and the solvent is removed to obtain the catalyst.

Example 3: Preparation of Oil Soluble Co/Ni Based Catalyst

To a solution of Cobalt (II) nitrate salt (0.5 eq.) and Nickel (II) nitrate salt (0.5 eq.) in water and hexane (1:2 ratio; 5 ml per 1 mmol of Co/Ni salt), the sodium 2-ethyl hexyl carboxylate (2 eq.) in water (solution of 1 mmol in 1 ml water) and sodium tri-deca carboxylate (2 eq.) in water/THF (solution of 1 mmol in 1 ml water/THF (1:1)) was added drop wise at 40° C. and the solution was refluxed for 3 h at 40° C. to obtain first mixture. The resulting reaction mixture was cooled and fractionated between water/hexane layers. The organic layer was washed with the water. The organic phase was dried ($NaSO_4$), concentrated in vacuum to afford the multimetallic carboxylate as a gummy solid (second mixture). Yield: 94%; WD-XRF: 1.9% Co and 2.2% Ni.

Example 4: Preparation of Oil Soluble Fe/Ni/Mo Based Catalyst

To a solution of Iron (III) nitrate salt (0.33 eq.), Nickel (II) nitrate salt (0.33 eq.) and Molybdenum (V) chloride salt (0.33 eq.) in water and hexane (1:2 ratio; 5 ml per 1 mmol of Fe/Ni/Mo salt), the sodium 2-ethyl hexyl carboxylate (4 eq.) in water (solution of 1 mmol in 1 ml water) was added drop wise at 40° C. and the solution was refluxed for 3 h at 40° C. to obtain first mixture. The resulting reaction mixture was cooled and fractionated between water/hexane layers. The organic layer was washed with the water. The organic phase was dried ($NaSO_4$), concentrated in vacuum to afford the multimetallic carboxylate as a gummy solid (second mixture). Yield: 88%; WD-XRF: 4.44% Fe and 3.36% Ni and 1.2% Mo.

Example 5: Heavy Oil Upgradation Using Fe/Ni Based Catalyst SOSCAT-7

This experiment describes the process for upgradation of vacuum resid using synthesized transition metal iron/nickel based oil soluble catalyst. The objective of selecting this highly dispersed catalyst was to maximize the yields of middle distillate products by upgrading the vacuum resid which boils above 540° C.

Initially, the reactor was fed with vacuum resid feed along with oil soluble catalyst (SOSCAT-7) concentration of 10000 ppmw metal. The reactor was purged with nitrogen to remove any air trapped inside the reactor and later was pressurized to 12 MPa with hydrogen gas to obtain the first reaction mixture. The first reaction mixture was heated to 420° C. under constant stirring at a speed of 1000 rpm to obtain slurry (second reaction mixture). The reaction was carried out in two stages of 1 h each maintaining the reaction temperature at 420° C. After completing the reaction, the products were quenched by circulating chilled water to bring down the temperature below 300° C. rapidly. The gaseous products were collected in a gas bomb and analyzed using RGA (residual gas analyzer, manufactured by PAC) for its composition. The liquid samples were collected and analyzed in GC-SIMDIST (manufactured by PAC) as per ASTM standards.

The details of product analysis are provided in Table I below. Table I briefly illustrates the catalytic performance of SOSCAT-7 in a formulation. It was observed that the resid fraction in feed which boils above 540° C. was converted into lighter hydrocarbons and the conversion achieved was 65.7% after 2 h reaction time. Additionally, the yield of the gaseous products obtained was 24%, liquid products were 42% and that of solid products was 34%.

TABLE I

Catalytic performance of Fe/Ni based oil soluble catalyst SOSCAT-7 in vacuum resid upgradation.

| Reaction time | Product yield (%) | | | Conversion of heavy oil feedstock into lighter hydrocarbons |
|---|---|---|---|---|
| | Gas | Liquid | Solid | |
| 2 hours | 24 | 42 | 34 | 65.7% |

Example 6: Heavy Oil Upgradation Using Fe/Ni Based Catalyst SOSCAT-14

Upgradation of refinery residue over Fe/Ni based oil soluble catalyst with benzoic acid (SOSCAT-14) as additive was carried out using the same procedure as described in Example 5 above. The fractional product yields and conversion of heavy oil feedstock into lighter hydrocarbons is illustrated in Table II below.

TABLE II

Catalytic performance of Fe/Ni based oil soluble catalyst SOSCAT-14 in resid upgradation.

| Reaction time | Product yield (%) | | | Conversion of heavy oil feedstock into lighter hydrocarbons |
|---|---|---|---|---|
| | Gas | Liquid | Solid | |
| 2 hours | 32 | 46 | 23 | 77.2% |

Table II displays the upgradation of vacuum resid resulted in 77.2% conversion using the catalyst SOSCAT-14, out of which the products on weight basis obtained in gaseous state were 32%, liquid distillate was 46% and those obtained in solid state were 23% with respect to the feed.

It was observed that the use of SOSCAT-14 multimetallic catalyst enhanced the resid conversion of higher boiling, low quality hydrocarbons into lower boiling, high quality hydrocarbons. The yield of the resultant lighter hydrocarbons was increased from 65.7% to 77.2% when SOSCAT-14 was used instead of SOSCAT-7 catalyst. The distillate yield also increased from 42% to 46% using SOSCAT-14.

Thus, an inference can be drawn that the catalyst formulation comprising multimetallic Fe/Ni based carboxylate salt and an organic acid is more efficient than the Fe/Ni based carboxylate salt alone in upgrading the heavy oil feedstock into lighter hydrocarbons in the same reaction time.

As is clear from Examples 1-4, the catalyst as described herein can be conveniently obtained through a wet-synthetic method. Furthermore, upgradation of vacuum residue yielded up to 77.2% conversion with 46% distillate yield. In conclusion, the present disclosure provides an easy-to-prepare catalyst formulation that is soluble in hydrocarbon oil and works efficiently for the heavy oil upgradation process.

Although the subject matter has been described in considerable details with reference to certain examples and embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the present subject matter as defined.

We claim:

1. A process for preparation of a catalyst, the process comprising the steps of:
   (a) obtaining at least one multimetallic carboxylate salt, wherein the at least one multimetallic carboxylate salt comprises at least two transition metals and at least one carboxylate, wherein the at least two transition metals are selected from the group consisting of V, Mo, Fe, Co, Ni, Cu, Zn, W, and combinations thereof;
   (b) contacting the at least one multimetallic carboxylate salt, and at least one organic acid with at least one solvent, wherein the at least one organic acid is selected from $C_{5-10}$ aryl monocarboxylic acids; and
   (c) removing the solvent to obtain the catalyst.

2. The process as claimed in claim 1, wherein steps (a) and (b) are carried out at a temperature in a range of 25-35° C. for a period in a range of 10-50 min; and wherein step (c) is carried out at a temperature in a range of 25-35° C. for a period in a range of 10-50 min.

3. The process as claimed in claim 1, wherein the at least one solvent is selected from the group consisting of toluene, xylene, diesel, kerosene, naphtha, and combinations thereof.

4. The process as claimed in claim 1, wherein obtaining the at least one multimetallic carboxylate salt comprises the steps of:
   (a) contacting
      (i) at least two transition metal salts independently having a Formula M-S, wherein M is at least one transition metal selected from the group consisting of V, Mo, Fe, Co, Ni, Cu, Zn, W, and combinations thereof, and S is a ligand selected from the group consisting of nitrate, halide, sulfate, sulfite, and nitrite;
      (ii) at least one carboxylate salt;
      (iii) water; and (iv) at least one solvent to form a solution;
   (b) refluxing the solution to obtain a mixture;
   (c) cooling and fractionating the mixture;
   (d) collecting an organic phase; and
   (e) drying the organic phase to obtain the multimetallic carboxylate salt.

5. The process as claimed in claim 4, wherein the step (a) is carried out at a temperature in a range of 50-90° C. for a period in a range of 100-200 min; and the step (c) is carried out at a temperature in a range of 25-35° C. for a period in a range of 10-50 min.

6. The process as claimed in claim 4, wherein (a) the at least one transition metal to the at least one carboxylate salt molar ratio in the mixture is in a range of 1:2-1:8 (b) the at least one transition metal to the water moles to volume ratio in the mixture is in a range of 1:1.5-1:2; and (c) the at least one transition metal to the at least one solvent moles to volume ratio in the mixture is in a range of 1:2-1:4.

7. The process as claimed in claim 4, wherein the at least one transition metal is selected from the group consisting of Fe, Ni, Co, Mo, W, and combinations thereof.

8. The process as claimed in claim 4, wherein the carboxylate salt is selected from R(COO)aXb, wherein 'a' is in a range of 1-2; when 'a' is 1, R is selected from the group consisting of C1-16 alkyl, C5-22 aryl, C1-16 haloalkyl, C3-12 cycloalkyl, C1-20 heteroaryl, and C1-20 heterocyclyl; when 'a' is 2, R is selected from the group consisting of C1-16 alkanediyl, C5-22 arylene, C1-16 haloalkanediyl, C3-12 cycloalkanediyl, C1-20 heteroarenediyl, and C1-20 heterocyclicdiyl; X is independently selected from the group consisting of Group 1 metals, Group 2 metals, and nitrogen based organic cation, and combinations thereof; and 'b' is in the range of 1-9, and have values such that carboxylate salt is a neutral molecule.

9. The process as claimed in claim 4, wherein the at least one solvent is selected from the group consisting of hexane, toluene, xylene, diesel, kerosene, naphtha, and combinations thereof.

* * * * *